(12) United States Patent
Vangbo

(10) Patent No.: US 6,875,299 B1
(45) Date of Patent: Apr. 5, 2005

(54) METHOD FOR PRODUCING A CORRUGATED LAMINATE CONTAINING WATERGLASS

(75) Inventor: Hakan Vangbo, Jarfalla (SE)

(73) Assignee: AB Carl Munters, Sollentuna (SE)

( * ) Notice: Subject to any disclaimer, the term of this patent is extended or adjusted under 35 U.S.C. 154(b) by 533 days.

(21) Appl. No.: 10/070,356

(22) PCT Filed: Sep. 20, 2000

(86) PCT No.: PCT/SE00/01830

§371 (c)(1),
(2), (4) Date: Mar. 5, 2002

(87) PCT Pub. No.: WO01/23174

PCT Pub. Date: Apr. 5, 2001

(30) Foreign Application Priority Data

Sep. 28, 1999 (SE) ..................... 9903498

(51) Int. Cl.⁷ ............................... B31F 1/24

(52) U.S. Cl. .................. 156/208; 261/112.2; 156/210; 428/182

(58) Field of Search ............................. 156/208, 210, 156/205; 428/182; 261/112.2

(56) References Cited

U.S. PATENT DOCUMENTS

| | | | | |
|---|---|---|---|---|
| 2,239,358 A | * | 4/1941 | Vail et al. | 106/632 |
| 3,419,937 A | * | 1/1969 | Bally | 425/369 |
| 3,936,339 A | * | 2/1976 | Lock et al. | 156/205 |
| 5,423,934 A | * | 6/1995 | Vangbo et al. | 156/208 |
| 5,505,769 A | | 4/1996 | Dinnage et al. | |

FOREIGN PATENT DOCUMENTS

| | | |
|---|---|---|
| DE | 4313820 | 11/1994 |
| EP | 1006238 | 6/2000 |
| SE | 462671 | 8/1990 |
| SE | 469976 | 10/1993 |
| SE | 501591 | 3/1995 |

* cited by examiner

Primary Examiner—Blaine Copenheaver
Assistant Examiner—Barbara J Musser
(74) Attorney, Agent, or Firm—Dowell & Dowell, P.C.

(57) ABSTRACT

The present application relates to a method for producing a laminate comprised of alternating smooth and corrugated sheets and which are to form a corrugated structure for the manufacture of contactors, characterized by that a first starting material is impregnated with a solution comprising water glass and additive whereas the additive is present at a high level and which is later corrugated and that a second starting material is impregnated with a solution comprising water glass and additive whereas the additive is present at a moderate level and that the both starting materials are brought together after the corrugation of the first starting material whereby the adhesion is maintained at a high level. The present application also relates to a laminate obtainable by said method and a contactor manufactured from a laminate obtainable by said method.

11 Claims, 1 Drawing Sheet

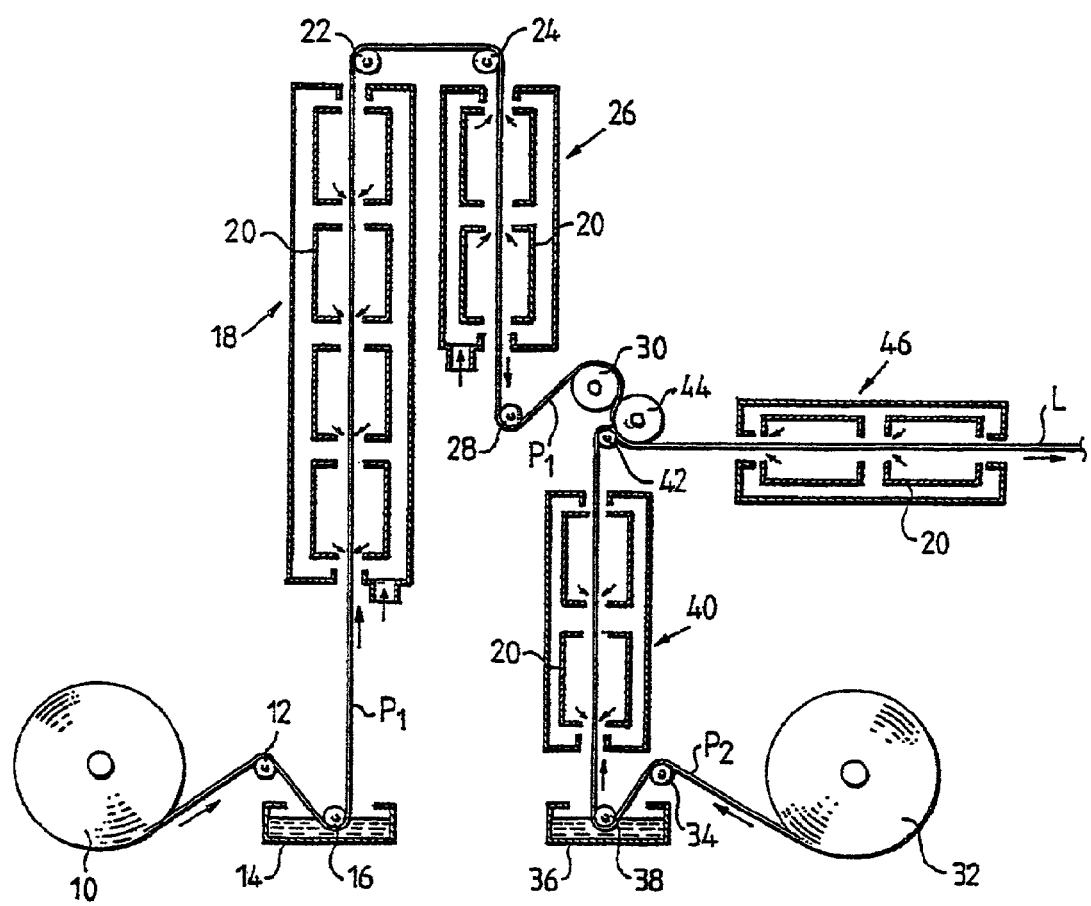

METHOD FOR PRODUCING A CORRUGATED LAMINATE CONTAINING WATERGLASS

The present invention relates to a method for the manufacture of a laminate comprised of alternating smooth and corrugated boards (sheets) which are to form a corrugated structure for the manufacture of contactors (contact bodies) for use in the exchange of heat, moisture etc. This laminate further has a high level of at least one additive.

The contactors are, for instance for exchange of moisture or heat or both, typically comprised of thin layers of formable material such as paper webs or glass fibres, cellulose or the like which can be formed into a laminate structure by combining smooth and corrugated sheets together of the paper web (board) or sheets mutually bonding the sheets so as to form a structure that exhibits a plurality of open through-passing passageways or cells.

In known methods for manufacturing of such contactors for instance in the form of a rotor, the corrugated and smooth paper webs are usually brought together with the help of an organic glue which also is applied to the laminate when glueing to form a rotor shaped contactor or when bringing together smooth sheets of laminate to a cube-shaped (formed) contactor. The contactor is thereafter impregnated with water glass solution in order to form a gel which then is converted through further treatments into a solid substance on the body which gives this contactor its moisture and heat transferring characteristics. In order to achieve impregnation with the water glass it is normal that the cube or the rotor is lowered (immersed) into a water glass solution whereby it is desirable to get in the body as great amount of water glass as possible into the body in order to give this good moisture and heat exchanging characteristics. When lowering into the water glass solution and the intaking of huge amounts of water glass, the body shrinks in size by 15–20%, which has to be taken into consideration when manufacturing the contactor. Another disadvantage with this known method is that the organic glue usually must be burned off in order to achieve a non-burnable contact body (contactor) and when this burn-off is performed the contactor will thus be un-impregnated where the glue has been present. Another disadvantage with this known method when the already formed contactor is lowered into the water solution is that the small canals in the contactor easily may be blocked which renders into that the water glass solution must be relatively diluted. Another disadvantage is hereby that the you may achieve an uneven distribution of the water glass.

Another method which is disclosed in SE 469 976 (WO 93/00220) is that in order to manufacture a laminate of alternating smooth and corrugated sheets which are to form a corrugated structure starting material is used, for instance a paper web of a formable material such as glass fibre, cellulose or the like. This staring material is impregnated with (or lowered into), through using impregnation means, a concentrated water glass solution and thereupon dried with drying means to a dry content of 45–65% when referring to water glass. The first paper web is corrugated thereupon with corrugating means and is brought together with the other smooth paper web which is impregnated with water glass and dried. The formed laminate of the both paper webs is dried to a dry content of approximately 60–95% with reference to water glass.

At an optional presence of additive in the water glass solution, when impregnating the paper webs, a maximum addition of approximately 20% (dry substance) of additive may be achieved in the final product. The dry substance in percent is here counted with reference to additive + the of water glass obtained dry silica gel. The paper itself which is impregnated is then not counted for. This percentage depends obviously further on the density of the additive and the particle distribution. As earlier standard procedures have been using the same concentration of additive in both water glass solutions there has only been possible to reach a certain level of additive in order to maintain a high adhesion at the pressing stage, that is when the paper webs are brought together, such as the adhesion which for instance accompanies the method in SE 469 976. For instance at a level of additive of 12% (SD, i.e. dry substance when the water glass is in liquid form and not yet has been converted to silica gel) in each water glass solution, the adhesion did not work. You will not get a glueing between the corrugated paper web and the smooth paper web. You may thus, when using the method in SE 469 976, only achieve a certain level of additive if such optionally would be present in those water glass solutions which respective paper web is impregnated in.

Drawbacks with the last-mentioned method is accordingly that you may not add in such a high degree, which may be desirable, an essential amount of additive in the water glass solution which may be desirable in many applications. A method where you may add essential amounts of additive e.g. molecular sieve (zeolites) which may absorb water, activated aluminium oxide, calcium oxide (or calcium hydroxide or -carbonate) or other sorbents, active carbon which may absorb hydrocarbons, water, ozone or smells, other dehumidifiers, filler material such as attapulgite or calcium silicate in order to achieve an enhanced mechanical strength, is thus desirable. In certain application you may want the ability to reach a high level of additive in a contactor whereby a method where you may achieve a laminate with a high level of additive thus is very desirable. 20–35% (dry substance) of molecule sieve in a contactor, that is a product manufactured of laminate may be desirable when treating certain air. Thus, there is a need for a new method where you may be able to add different additives (fillers) in an essential amount to the water glass and at the same time maintain a high adhesion between the paper web such as in SE 469 976.

We have now in this new method achieved that you may reach a level of 20–35% (dry substance) additive in the end product, that is the laminate, and despite this maintain a high adhesion between the paper webs such as the one accompanying the method in SE 469 976. This purpose and other purposes are achieved through that the method according to the invention has been conferred the in the following patent claims mentioned characteristics.

The invention according to the present application relates to a method for the manufacturing of a laminate of alternating smooth and corrugated sheets which are to form a corrugated structure for the manufacture of contactors for the exchange of heat, moisture etc. characterized by that a first starting material such as formable material for instance glass fibre, cellulose or the like, is impregnated with a solution comprising water glass and additive whereas the additive is present at a high level (concentration) and which later goes through corrugation and that a second starting material such as a formable material, for instance glass fibre, cellulose or the like is impregnated with a solution comprising water glass and additive whereas the additive is present at a moderate level (concentration) and that the both starting materials are brought together after the corrugation of the first starting material. The present application also relates to a laminate obtainable by said method and a contractor manufactured from a laminate obtainable by said method.

The additive in the method according to the present application may be: molecular sieves, activated aluminium oxide, calcium oxide (calcium hydroxide or -carbonate) and other sorbents or other dehumidifiers, fillers such as calcium silicate or attapulgite, spherical microballoons, kaolin, feldspar, talc which gives strength and easily may work against leakage, and active carbon. Different examples of molecular sieves (preferably zeolites) are present in "Zeolite Molecular Sieves", Donald W. Breck, 1974, 1st edition. The zeolites may further be both synthetical or natural. These above mentioned additives may be present alone or in any combination with each other in the water glass. The expression "additive" thus in the present application is intended to embrace one or more of thex above additives.

The expression "high level" is intended to embrace in the first-mentioned solution of the method according to the invention, comprising water glass and additive, that the additive is present in a level of from 8 to 15% (DS, that is dry substance where the water glass is a liquid and not yet has transferred into silica gel) regarding the mixture when the water glass dry substance is 35 to 40%. Please note that this dry substance content is not calculated in the same way as in the final product, that is in the laminate. The water glass level is then for "high level"-solution of approx. 85 to 92% (DS). Preferably the additive is present in a level of from 8.1 to 15% (DS), most preferred 15% (DS). The water glass with 35 to 40% (DS) is often referred to as concentrated water glass. These levels may further be varied within the scope for the present invention through diluting with water. This water will then be evaporated during the drying processes whereupon the end product essentially will correspond to the one which may be obtained when concentrated solutions are used.

The expression "moderate level" is intended to embrace in the last mentioned solution (i.e. the second solution) in the method according to the invention comprising water glass and additive, that the additive is present in a level from 0.1 to 8% (DS), preferably 8% (DS). The water glass level is then for "moderate level"-solution from 99.9% to 92% (DS). These levels may obviously be varied further within the scope of the present invention through diluting with water. This water will then evaporated during the drying processes whereupon the end product composition essentially will correspond to the one which may be obtained when concentrated solutions are used.

According to a preferred embodiment of the method according to the present application the high level is approximately 15% (DS) and the moderate level is approximately 8% (DS).

According to a preferred embodiment of the method according to the present application the water glass is present in the form of a concentrated water glass solution, i.e. it has a dry substance of from 35 to 40% (DS).

Water glass is further a solution with silica acid ($SiO_2$) and disodium oxide ($Na_2O$) where the molar ratio $SiO_2/Na_2O$ normally may be from 2.2 to 3.8, preferably from 3.2 to 3.3. Water glass may also be described as $(Na_2O)_m(SiO_2)_n$ wherein the ratio between the two oxides (n/m) may vary as described above.

According to a preferred embodiment of the method according to the present application a further small amount of water may be added to the water glass solution of viscosity reasons.

According to a preferred embodiment of the method according to the present application the corrugation may be performed with a tooth contour (gear teeth) where the pitch (tooth factor, or, set of teeth) is from 1.3 to 1.7, preferably from 1.4 to 1.6. During corrugation normally a tooth contour may be used where the tooth factor is approximately 1.43. Due to the more wells (corrugations, tracks) that are achieved on the first paper web the more additive may be present in the end product. This has to do with the so called length factor. The length of a corrugated paper is in reality much longer than it appears to in a corrugated (folded) condition.

The invention will be further described in more detail in connection with the drawing which shows an example of the method according to the present application. The FIGURE shows schematically an installation for the manufacture of a laminate of alternating smooth and corrugated sheets which may be used for the manufacture of contactors whereby you may add more additive and still maintain an adhesion which corresponds to the one achieved during the method in SE 469 976.

In the in FIG. 1 showed installation, 10 denotes a roll consisting of a paper web of a formable or shapeable material such as fibre glass, cellulose or the like. Other formable materials which are thinkable for use as a paper web is carbon fibre, kaolin fibre, mineral fibre or low density paper of inorganic fibres. From the paper roll 10 the paper web is taken in a direction of the arrow shown, and is passed over a guide roller and down into a vessel 14 which comprises water glass solution and additive. The paper web P1 is guided down beneath the surface of the solution in the vessel 14 by using as a guide roller 16 which is emerged in the solution. The vessel 14 comprises additive in a high level, in this case 15% (DS) and for the rest concentrated water glass. During the passage through vessel 14 the paper web P1 is impregnated with the solution. Of course the impregnation of the paper web may also be done through application on a paper using the solution in vessel 14, which subsequently will be converted to silica gel for impregnation of the paper. After the impregnation (saturation) of the solution the paper web P1 is moved upwards as seen in the drawing to a the drying station 18 which comprises a plurality of drying sections 20 in the illustrated case four drying sections which may either operate with hot air units or infrared units. The paper web P1 is then advanced via guide rollers 22 and 24 to a further drying station 26 which comprises drying sections 20 of the afore described type and in which the paper web P1 is further dried. The paper web P1 is then passed via guide roller 28 to a corrugating roller 30 where the web P1 is corrugated so as to form a large number of shallow corrugations in the paper web. The corrugating roller has a tooth contour where the pitch is 1.43. In order to form the described laminate of alternating smooth and corrugated sheets a second paper web P2 is taken from a paper roll 32 and is passed via guide roller 34 into a vessel 36 which comprises water glass and additive and in which the paper web P2 is emerged via roller 38. The vessel 36 comprises additive in a moderate level, in this case 8% (DS) and for the rest concentrated water glass. The paper web P2 is therewith saturated (impregnated) with the solution and is passed from the vessel 36 to a drying station 40 which includes a plurality of drying sections 20 which are of the same kind as those earlier described with reference to drying of the paper web P1. The paper web P2 is preferably dried in the drying station 40 from that side of the web which later will face away from the paper web P1 when the two webs P1 and P2 are brought together to form a laminate.

During this bringing together an adhesion is maintained such as the one as in the cited patent document SE 469 976 at the same time accompanied by an addition of more additive than a skilled person in the art would have expected. After leaving the drying station 40 the paper web P2 is combined with the corrugated paper web P1 via the guide roller 42 and the combined paper webs forming the laminate L are pressed together between the guide roller 42 and the roller 44, thereby bringing the webs together at which the water glass serves as a bonding agent. After bonding together of the paper webs, the resulting laminate L is passed through yet another drying section 46 which comprises a plurality of drying sections 20 of the former described kind. When the laminate leaves the drying section 46 the additive has a content of 32.8% (dry substance) and for the rest water glass which at this point mainly has transferred to silica gel, that is has become solid. In this case dry substance is counted in percent in relation to additive + the of the water glass obtained silica gel. It is obvious that the shown and described method only is an example of the realisation of the invention and this may be varied within the scope of the following patent claims.

What is claimed is:

1. A method for producing a laminate comprised of alternating smooth and corrugated sheets which are to form a corrugated structure for the manufacture of contractors for the exchange of heat, moisture and the like including the steps of:
    impregnating a first formable starting material with a solution comprising water glass and an additive, wherein the additive is present at a high level and thereafter corrugating the first formable material,
    impregnating a second starting material with a solution comprising water glass and an additive wherein the additive is present at a moderate level, and
    thereafter bringing the first and second starting materials together after corrugating the first starting material to thereby produce a laminate.

2. A method according to claim 1, wherein the high level is from 8.1 to 15% (DS) and the moderate level is from 00.1 to 8% (DS).

3. A method according to claim 2, wherein the high level is 15% (DS) and the moderate level is 8% (DS).

4. A method according to claim 1, wherein the water glass is present as a concentrated water glass solution.

5. A method according to claim 4, wherein the concentrated water glass solution has a dry substance of 35 to 40% (DS).

6. A method according to claim 1, wherein the corrugating is performed using a tooth contour where a pitch is from 1.3 to 1.7.

7. A method according to claim 6, wherein the pitch is 1.43.

8. A method according to claim 6 wherein the pitch is from 1.4 to 1.6.

9. The method of claim 1 whenever said first and second starting materials are selected from a group consisting of glass fibers and cellulose materials.

10. A laminate for use in manufacturing of contractors including a first formable material impregnated with a solution comprising water glass and an additive, wherein the additive is present at a high level and the first material is corrugated, a second material impregnated with a solution comprising water glass and an additive wherein the additive is present at a moderate level, and the first and second materials being joined together to thereby produce a laminate.

11. A contractor comprising a laminate body including a first formable material impregnated with a solution comprising water glass and an additive, wherein the additive is present at a high level and the first material is corrugated, a second material impregnated with a solution comprising water glass and an additive wherein the additive is present at a moderate level, and the first and second materials being joined together to thereby produce a laminate.

* * * * *